Patented Sept. 10, 1935

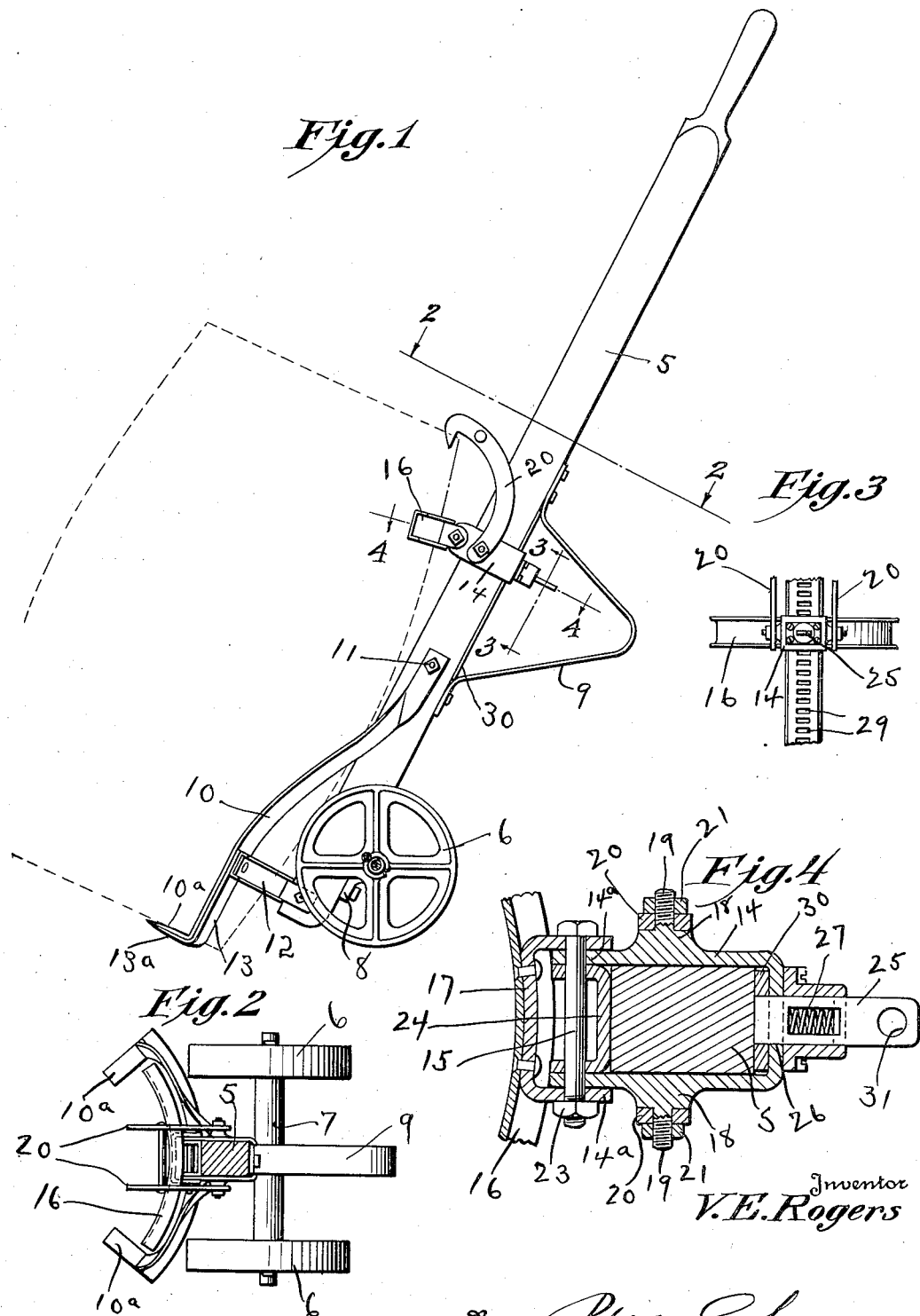

2,014,057

UNITED STATES PATENT OFFICE 2,014,057

TRUCK FOR HANDLING BARRELS

Victor E. Rogers, Madison, Wis.

Application March 27, 1934, Serial No. 717,649

4 Claims. (Cl. 280—53)

This invention relates to barrel trucks, and among other objects, aims to provide an improved barrel truck which will handle barrels or kegs of various sizes, and will hold them so securely that they cannot fall off the truck and cause accidents.

In the accompanying drawing illustrating a preferred embodiment of the invention,—

Fig. 1 is a side elevation of the barrel truck, showing a barrel in dotted lines;

Fig. 2 is a section on line 2—2 of Fig. 1;

Fig. 3 is a section on line 3—3 of Fig. 1; and

Fig. 4 is a section on line 4—4 of Fig. 1, but on a larger scale.

Referring particularly to the drawing, there is shown an improved barrel truck comprising a handle 5, a pair of wheels 6 mounted on a common axle 7 secured by a bearing 8 to the lower end of the handle and a leg 9 secured to the handle at an intermediate point and adapted to co-operate with the wheels 6 to support the load when the handle is in a horizontal position.

Secured to the lower portion of the handle is a cradle 10 which comprises two steel arms rigidly secured at their upper ends on either side of the handle 5 as shown at 11. The two steel arms are secured together by means of an arcuate brace 12, which is rigidly mounted on the lower extremity of the handle 5, the outer ends of the brace 12 being secured to the under sides of the cradle arms. Preferably, the lower extremities of the cradle arms 10 are bent outwardly substantially at right angles, as indicated at 10a, and a pair of re-enforcing straps 13 are preferably interposed between the free ends of the brace 12 and the cradle arms 10, as shown in Fig. 1, said re-enforcing straps also being bent at right angles, as shown at 13a, and extending beyond the ends of the right angle extensions 10a. The outer edges of the extensions 13a may be beveled on the under side so as to provide prongs which may be inserted underneath the barrel or keg without any substantial resistance. The extensions 13a and 10a are preferably welded together so as to form a pair of unitary arms or prongs for supporting a barrel or keg in the manner illustrated in Fig. 1.

Slidably mounted on the handle 5 at an intermediate point is a bracket or sleeve 14 which is securely held in adjusted positions between the two limits of movement determined by the opposite sides of the leg 9. The leg 9 thus prevents the slide 14 from moving beyond the desired limits. The slidable sleeve 14 is preferably substantially U-shaped in cross section, as shown in Fig. 4, and is sufficiently long to provide a pair of projecting ears 14a, which have alined perforations to receive a pivot bolt 15, on which a barrel rest 16 is pivoted. The barrel rest 16 is arcuate longitudinally and is mounted on the pivot bolt 15 by means of a U-shaped bracket 17, whose arms are also perforated to receive the pivot bolt 15, and whose intermediate portion is riveted to the barrel rest. The barrel rest 16 is so mounted as to be freely oscillatable on the pivot bolt 15 and thus may adjust itself to barrels of different sizes and shapes. The curvature of the barrel rest 16 is substantially the same as the curvature of the brace 12, which also provides a barrel rest at the lower end of the handle, as will be understood from Fig. 1.

Projecting from opposite faces of the slidable member 14 are a pair of bosses 18 having screw-threaded studs 19 extending outwardly. A pair of hooks 20 are pivotally mounted on the studs 19 and hence are swingable on opposite sides of the handle 5. A pair of nuts 21 hold the hooks 20 on the studs 19, said hooks having sufficiently large perforations at their pivot-ends to swing freely about the studs 19 as axes. A rod 22 connects the two hooks together so as to force them to swing in unison and said rod also serves as a stop to prevent the hooks 20 from falling down below the axis on which they swing when not in use.

As tightening of the nut 23, which is on the pivot bolt 15, would tend to draw the ears 14a together and thus clamp the handle 5 and prevent free movement of the slidable member 14 along the handle, a suitable spacer is interposed between the ears 14a, said spacer being preferably a U-shaped clip 24, whose arms are contiguous to the ears 14a and which are perforated to permit the pivot bolt 15 to pass through them. The clip 24 may have a broad bearing face so as to slide along one side of the handle 5 without injury to the handle. Obviously, the construction is such that the hooks 20, the barrel rest 16 and the slidable member 14 with its associated parts may all be removed from the handle 5 and may be replaced without the trouble of removing the leg 9.

The means for securing the slidable member 14 in adjusted positions comprises a spring plunger 25, slidably mounted in a boss 26, which is removably mounted on the slidable member 14. The boss 26 not only has a slot to receive the plunger 25, but is also hollowed out to provide a housing for a coil spring 27, which tends to project the plunger 25 inwardly against the handle 5. The slidable member 14 has a perforation 28 to permit the plunger 25 to pass through it and to engage one of a series of notches or slots 29 formed in a strap 30 secured to the under side of the handle 5. The plunger 25 preferably has a finger opening 31 to permit the operator to withdraw it against the tension of spring 27, whereupon the slidable member 14 may be moved up or down until the hooks 20 are properly positioned to engage the chime of the barrel, as will be understood from Fig. 1.

The described construction provides a truck which will carry barrels weighing as much as 600 lbs., and also small kegs. It securely grips a barrel so that there is no likelihood of the operator getting injured. Both metal and wooden barrels and kegs are handled with equal ease. In adjusting the barrel-gripping device, the operator places the hooks over the chime of the barrel, pulls outwardly on the plunger to release the lock and then moves the slide into the position which assures effective gripping. Another feature of the construction is that the hooks 20 are so shaped that they are self-adjustable to different thicknesses of chimes, that is, they will automatically adjust themselves to any chime from one-fourth inch to two inches in thickness. The only adjustment necessary is the slide adjustment for different heights of barrels and kegs.

Obviously, the present invention may be embodied in various constructions other than the one selected for illustration.

Having described the invention, what I claim as new and desire to secure by Letters Patent is:—

1. A barrel truck comprising, in combination, a handle; means for supporting a barrel on the handle; a pair of wheels for supporting the handle; a slide movable longitudinally of the handle; means to secure the slide against movement on the handle; a barrel rest pivotally mounted on the slide; and a hook pivoted on the slide and adapted to engage a barrel chime with its outer end.

2. A barrel truck comprising, in combination, a truck having means for supporting a barrel; a slide movable longitudinally of the truck; a pair of spaced barrel-gripping hooks pivoted to the slide; a barrel rest mounted on the slide and adapted to adjust itself angularly to barrels of different sizes and shapes; a spring-pressed plunger slidable on the slide and adapted to be projected inwardly, the outer end being manually withdrawable; and means on the truck adapted to co-operate with the plunger to lock the slide in various adjusted positions on the truck.

3. A barrel truck comprising, in combination, a truck having means for engaging the lower end and the side of a barrel to support the same; a slide movable along a handle forming a part of the truck; co-operating manually controlled means on the handle and slide giving step-by-step adjustment of the slide; a hook pivoted on the slide to engage a barrel chime and a barrel rest pivoted on the slide to engage the side of a barrel near its top.

4. A barrel truck comprising, in combination, a frame; a pair of wheels for supporting the frame; means for supporting a barrel on the frame; and means for holding a barrel on the frame when supported by said supporting means; said barrel-holding means comprising a member adjustably secured to the frame, a barrel rest pivotally attached to said member and a pair of hooks pivoted on said member and adapted to engage the chime of a barrel supported on the truck.

VICTOR E. ROGERS.